US 7,126,466 B1

(12) United States Patent
House et al.

(10) Patent No.: US 7,126,466 B1
(45) Date of Patent: Oct. 24, 2006

(54) NETWORK STATUS ANIMATION TOOL

(75) Inventors: Ronald Louis House, Overland Park, KS (US); Joe B. Quint, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 147 days.

(21) Appl. No.: 10/993,178

(22) Filed: Nov. 19, 2004

(51) Int. Cl.
*G08B 29/00* (2006.01)

(52) U.S. Cl. ..................... 340/507; 345/473

(58) Field of Classification Search ............ 340/507; 345/473, 502, 537; 455/433
See application file for complete search history.

(56) References Cited

U.S. PATENT DOCUMENTS

| | | | | |
|---|---|---|---|---|
| 5,091,849 A | * | 2/1992 | Davis et al. | 345/502 |
| 6,175,343 B1 | * | 1/2001 | Mitchell et al. | 345/8 |
| 6,175,732 B1 | * | 1/2001 | McDaniel et al. | 455/433 |
| 6,738,065 B1 | * | 5/2004 | Even-Zohar | 345/473 |

* cited by examiner

*Primary Examiner*—John Tweel, Jr.

(57) ABSTRACT

A web-based geographic network status tool using an animation process uses sequential displays of web pages, one after the other. Each page reflects the status of the network for a different time block. The animation optionally includes two layers. One layer shows which elements (towers) are faulty and why (e.g., subject to power failure, undergoing software or hardware problems, transport problems). The other layer displays if the problem has been perpetuated for more than one time block.

30 Claims, 3 Drawing Sheets

NETWORK STATUS ANIMATION TOOL

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates generally to the field of managing telecommunications networks. More specifically, the invention is directed to the field of analyzing wireless network outage information.

2. Description of the Related Art

Wireless telecommunications service providers typically manage complex wireless networks (E.g., CDMA networks). The overall network is geographically divided into coverage areas commonly referred to as "cells." Each cell is wirelessly serviced by a particular tower located in that cell. The cell perimeters are normally irregularly shaped. This is because the distance for coverage for a specific tower will vary depending on terrain, tower effectiveness, as well as other factors. Because of this, an overall map of the entire network will resemble a puzzle, the coverage cells being the pieces.

When such a system is engaged by destructive forces, e.g., weather, power surges, or acts of terrorism, network administrators often need information regarding the functionality of the various cells in the network. Sometimes the information is retrieved in real time. This is necessary so that the user may assess the current condition of the network and its many elements (cells). Other times, the information needed is historical in nature. This information is used to determine in hindsight what the causes for system failures were, and possibly use this information to prevent reoccurrence.

Using conventional systems and methods, these assessments are tedious and otherwise difficult. They involve assimilating all of the tickets which the user deems relevant to the event. Tickets are error messages which are created to provide some indication of a change of status or network problem. In the context of a wireless network, each ticket will be received regarding a cell functionality issue. For example, the ticket might indicate that the tower serving the cell has lost power. The ticket may be generated by a human, or automatically by a computing device or system.

The occurrence of a major network event, e.g., a hurricane, will result in the generation of numerous tickets being transmitted at numerous intervals as the storm moves through a coverage area. To manage this flood of ticket information, either in real time, or historically is quite a chore. If the interested party wishes to analyze the hour-by-hour effects of the storm, they will have to access all of the tickets generated from each cell in each hour. The times and cells involved must be kept straight to ensure accurate record generation. If this process is repeated for, e.g., every hour of a two day storm, the significant data collected is difficult to assimilate into a useable medium. Maps may be manually generated, but this process is slow, prone to error, and usually too slow to allow for any real-time application. Patterns are difficult to recognize because there is no user friendly format to make an hour-by-hour comparison fruitful.

Additionally, by the time the user has assembled current ticket information and created some means of comparison to the earlier hourly ticket information, the current information may become stale because of the delay.

Thus, there is a need in the art for a system and method which enables the user to quickly manipulate assembled ticket information for real time and historical purposes.

SUMMARY OF THE INVENTION

The system and method of the present invention overcome these disadvantages by creating a network tool which geographically presents network elemental status in animated form.

The system comprises a database having a first interface for periodically receiving status information regarding a plurality of distinctly-located network elements from a human or automated client in order to maintain a historical record of the status of said plurality of distinctly-located network elements. The database includes a second interface which enables a user to access status information for a plurality of instances in the historical record. Also included is a geographical viewer. The geographical viewer uses the instances accessed to create an graphical animation which sequentially displays each instance.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
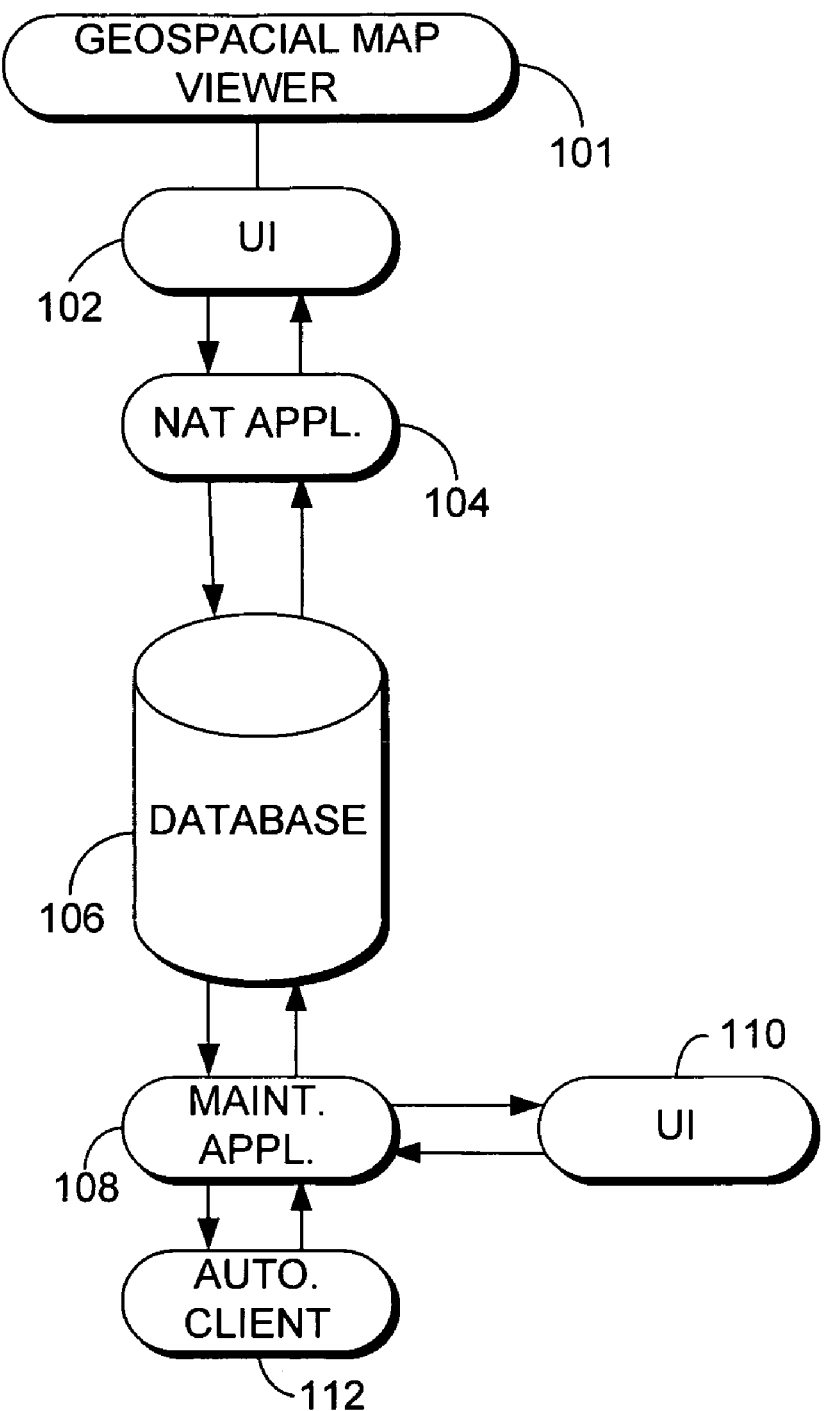
FIG. 1 is a schematic diagram showing one environment in which the system and method of the present invention may exist.

The present invention provides a system and method for creating a geographic network status animation. The animation process involves a sequential display of web pages, one after the other. Each page reflects the status of the network at a different time. The animation includes two layers. One layer shows which elements (towers) are faulty and why (e.g., subject to power failure, undergoing software or hardware problems, transport problems). The other layer displays if the problem has been perpetuated for more than one time block, e.g., existed for more than 4 hours. Either one of the two layers may be selected alone, or both may be displayed at the same time.

Various technical terms are used throughout this description. These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a sub-component of the Internet, "web"—as used herein—should not be construed as limited to the WWW. Rather, "web" is intended to refer generally to the Internet and/or its related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

One embodiment for an environment in which the system and methods of the present invention may exist is disclosed in FIG. 1. Referring to the figure, we see that the system includes a database 106. Network status information will be gleaned from database 106 using a geospacial map viewer plug-in 101 through a user interface 102. A geospacial plugin is a commercially available software program which is loaded onto a PC, laptop, or other workstation to work with web applications and enable the user to access map information over the web to generate network status animations as will be discussed hereinafter. User interface 102 is a graphical user interface, or other known sort of interface accessed over the web, an intranet, or possibly even some sort of LAN. With the preferred embodiment, however, the interfacing takes place over the web.

Most of the processes of the present invention occur using a network animation tool (NAT) 104 which is a software application. This application may be running on an application server, e.g., an Apache server, or some other kind of web server. NAT application 104 will access network status data in database 106 as needed.

The other side of FIG. 1 includes the systems used to generate the wireless network status information in database 106 which will be used to generate the graphical animation. A maintenance application 108 is used to manage status tickets. A ticket typically includes a date and time at which the ticket was transmitted. Also part of the ticket is a Base Transceiver Station (BTS) number, and a switch identifier. These features together identify the particular cell to which the ticket pertains. The ticket will also include information regarding the reason for failure of the tower.

Tickets come from one of two sources. The most common source is from an automated client 112. Automated clients like client 112 will be well known to those skilled in the art. This type of client might include software applications which monitor the status of a geographical cell. Automated clients such as these automatically generate tickets which electronically convey in an email a substantive explanation for the problem encountered. If no specific problem is ascertainable, the ticket may indicate that the cause is unknown. The second source of tickets might be received is from a human client directly through a user interface 110. For example, a systems administrator might manually generate an email. This email would be received by the maintenance application 108. This email, like with the automated process, will include the substantive reason for the network failure in the cell.

Upon receipt of the status information from one of human client 110 or automated client 112, application 108 will cause that information to be maintained in database 106. From database 106, the information may be accessed by NAT application 104. In one embodiment, NAT application 104 accesses the ticket information on command, or as a matter of a routine running in the NAT application. In a another embodiment, NAT application 104 is made synchronous with maintenance application 108. In the synchronous embodiment, maintenance application 108 communicates with NAT application 104 and arranges simultaneous transmission of the ticket information across database 106 without any prompting. This enables the information to be immediately received by NAT application 104 for continuous live map viewing through web browser interface 102.

With either the synchronous or nonsynchronous arrangements, the BTS number and switch identifier of the ticket will be used to match the failure information with the appropriate geographical cell shown in the map created by the geospacial map viewer 101.

Figure 2:
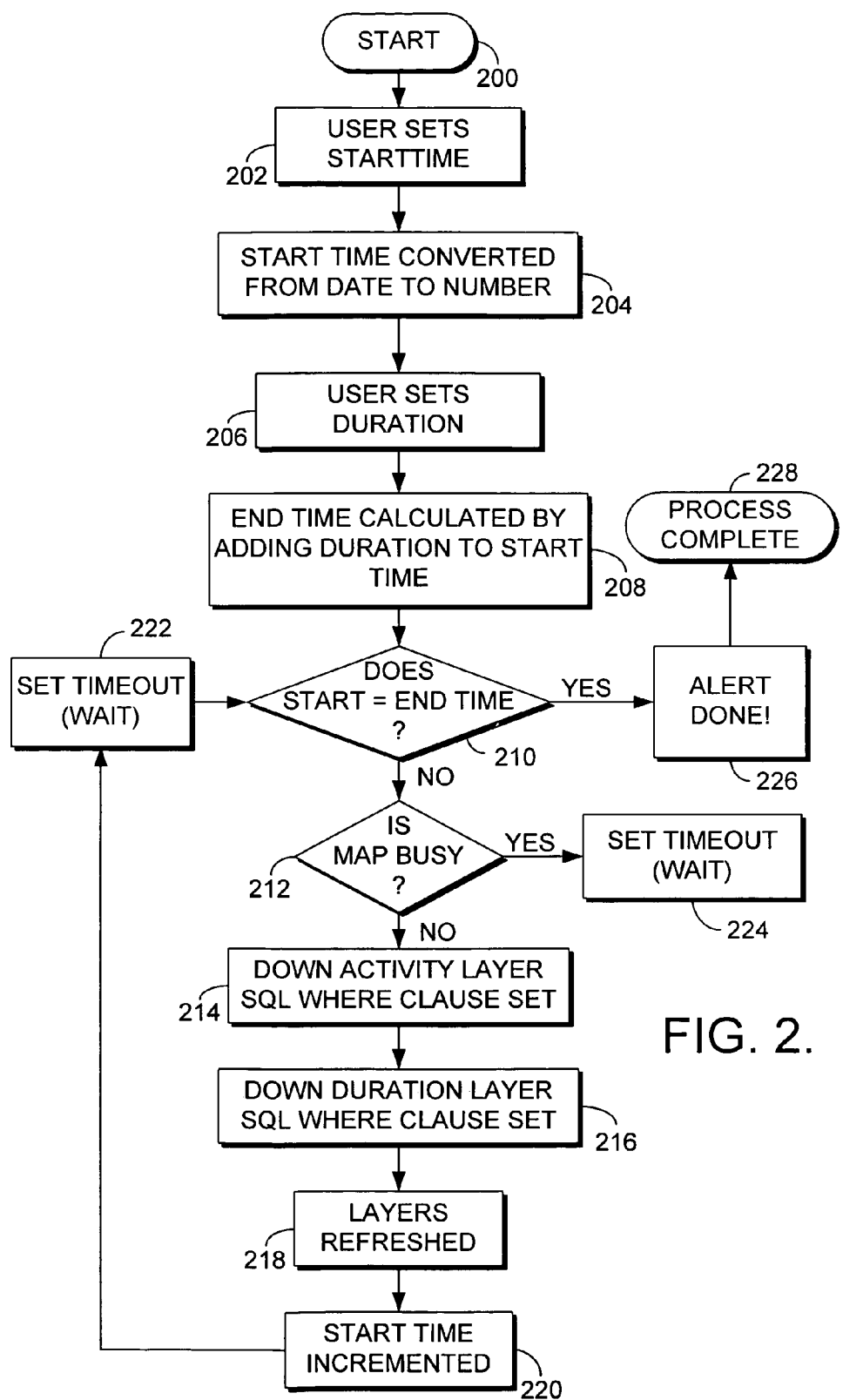
FIG. 2 is a flow chart showing the basic steps of one embodiment of the present invention.
Figure 3:
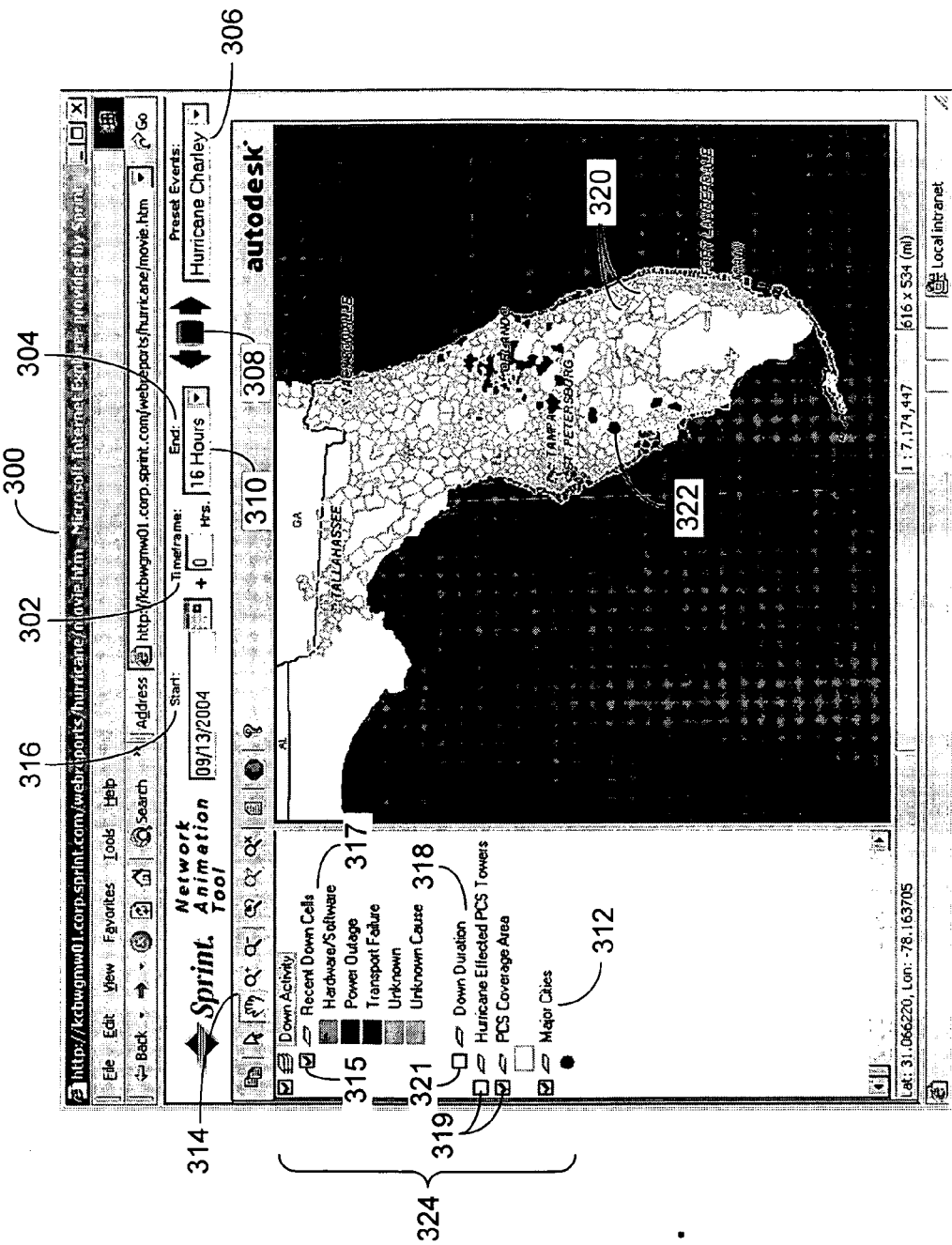
FIG. 3 is a screen shot for one instance being displayed for a user for one embodiment of the present invention.

A more specific representation of the processes running on NAT server 104 may be seen in FIG. 2. The process is kicked off using a start command at a step 200. This is accomplished over the web. To do so, the user will have already brought up NAT application 104 by entering the IP address for the application in the user's web browser (here, user interface 102). Once the application has been brought up, it is likely that the application will have typical security screens in place requiring the entry of a username, password, and any other security-access required information the administrator sees important to protect the proprietary NAT application and the network status information which is stored in database 106. Once these security procedures have been completed, the user will see a screen 300 in his or her web browser as shown in FIG. 3. Web page 300 in FIG. 3 will be referred to along with FIG. 2 to fully understand the step by step process.

In a next step 202 the user sets a start time. The start time will mark the beginning time for the animation which will be created. This start time is selected from a drop down menu 316. Drop down menu 316 enables the user to select from a variety of dates and times in a manner which will be known to those skilled in the art. In the instance the network event was, e.g., a hurricane, the user might select a start time which immediately precedes the arrival of the hurricane. Thus, the effect of the hurricane on the cells in the network may be observed.

NAT application 104 will already have associated with it a particular monitoring time block. In the disclosed embodiment, this time block is 4 hours. The time block is the increment at which the animation process will be run. In other words, each frame in the animation process will represent the status of the cells at one instance every four hours. In the disclosed embodiment, this time block is a preset constant. One skilled in the art, however, will recognize that it could be reset easily by a systems administrator, or other user. It is also possible that web browser screen 300 could provide the user means to change the time block increment (via field or drop down menu). Here, however, the time block (4 hours) has been preset at a value selected to best reflect by animation the effects of the event, e.g., hurricane.

Once a start time has been selected, in a step 204 NAT application 104 converts the start time selected from drop down menu 316 from a date to a number. The reason for this conversion is that a number will be more useable for querying the database 106 for ticket/status information regarding the particular network elements (towers). This is because the dates are in string format. With the time included, this makes the combination difficult to search for. By using a number to represent both date and time, querying is thus made easier. The way this has been accomplished in the present embodiment is to use the hour of the year to represent the date and time. Per this process, the minutes are truncated. A military 24 hour clock is used to come up with the hour of the date selected. This is then added to the hours already expired that year. Using the date shown in FIG. 3 as an example, we would first calculate the hours. The time shown is 11:03 PM. Converting this to military time (23:03) and then truncating we come up with 23 hours that day. Then, using the Aug. 13, 2004 date, the total number of days already having occurred would be 225 days. Multiplying by 24 to get the number of hours for days already occurred that year, we get 5400 hours. Thus, the number generated by the NAT application to identify 11:03 PM on Aug. 13, 2004 would be 5400 hours+23 hours=hour number 5423. The NAT application will uses this hour number in processing the start time, and in other processes.

Now that the start time (hour number 5423) is expressed in a manner useable to the application, in a step 206 the user will set an animation duration using drop down menu 304. The drop down menu 304 includes a period of time (e.g., "1 day" is shown in FIG. 3) that is a multiple of the incrementing time block (4 hours) of the NAT application. For example, where the time block is 4 hours, the possible ending time frames might be 0 hours (for a start-time display only), 4 hours, 8 hours, 16 hours, 1 day, 2 days, 3 days, 1 week, etc. Other end times could be provided as well, so long as they are consistent with the time block increment selected.

Once this end time is selected in step 206, the NAT application calculates the end time. This is done by simply adding the hours included in the duration entered by a user and adding them to the hour identifier for the start time already selected. Here, the selection of 1 day for the duration would result in an end time number of 5447, calculated by the NAT application by taking start time hour number 5423, adding 24 hours, and coming up with an end time hour number 5447. Thus, the end time would be identified by the application as hour number 5447.

Next, in a step 210 the NAT process determines if the start number (now 5423) is equal to the end time (now 5447). Since that is not yet the case, the process will move on to a step number 212. This is a simple wait process. It is designed to ensure that all map-generating processes of the geospacial map viewer 101 have completed before a new map is generated. If the mapping processes are not complete, the process will go a time out step 224. The time out step will cause the process to wait for a short increment, then return to step 212 to again ascertain whether the mapping processes for the last generation have completed.

Once all the mapping processes are complete, the process moves on to a step 214 in which the NAT process 104 queries database 106 for down cell activity information. This query will cause all the nonfunctioning cells for the particular interval to be recognized by the map viewer 101. This is done using an SQL where clause set. The query limits the collected data to only include status information regarding which cells are down (nonfunctional) for the time period of the current 4 hour increment up in the process. Of the status information retrieved, the NAT application will assign a particular color code or shading (recognizable by map viewer 101) for each of a variety of different problems. For example, the occurrence of a software or hardware problem could be indicated in red. A power outage could be shown as gray. Transport failures could be shown in green. You could even provide a cooler code for situations where a ticket does not make it clear whether a cell is functional or not, or where it is determined that the cell is down, but the precise cause of the inoperability is unknown.

The information extracted from the database as the result of query step 214 will be only a fraction of the total ticket information maintained in database 106 by the maintenance application 108. The only information pulled will be that regarding the increments selected and for the status characteristics sought (e.g., the cells that are down, and the reason for the outage).

Because geospacial map viewer 101 will not recognize the BTS and switch information included in the ticket information queried, the NAT application 104 takes the ticket BTS number and switch identifier and using a look up table locates an appropriate cascade ID. The geospacial map viewer will have a particular geographic plot on the map designated to a particular cascade ID. The application uses the look up table to translate the ticket BTS and switch information, which is not identifiable by viewer 101, to an appropriate cascade ID which is recognized by viewer 101. This enables the proper cell shading and color coding being made on the map which is to be generated.

Thus, in step a first layer of map information is generated which includes (i) geographic representations of all of the cells on the grid which are down, and (ii) a color identification for each of these down cells as to just what the problem is.

The process, in a next step 216, also includes the creation of a second layer. A layer is two items on the same geographical map, one superimposed on top of the other. Here, the second layer will include down duration information—or in other words—an indication of which of the down cells were also down in the last 4 hour time block.

Step 216 is accomplished by the NAT process using another SQL where clause set. This query limits the collected data to include status information regarding which cells are down at the current 4 hour time block interval which were also down in the 4 hour time block immediately preceding—an indication of a continued problem. Once it is determined which cells apply, NAT application 104 will assign a particular color or shading. The color or shading selected should be one which is easily distinguishable from the other colors selected in step 214 to prevent confusion when the two layers are superimposed one on the other by the map viewer 101.

Again, because geospacial map viewer 101 will not recognize the BTS and switch information included in the ticket information queried, the NAT application 104 converts these for each cell to a cascade ID which enables the map viewer to color or shade the appropriate cells as being ones which have been down for significant duration (for at least more than one 4 hour time block).

Once the NAT application assimilates the information necessary to generate both layers in steps 214 and 216, the layers are displayed to refresh the map maintained on viewer 101 appearing as shown in FIG. 3. As seen in the figure, the map generated will show a number of cells 320 which are not colored or shaded at all. The map will also show another group of cells 322 which are shaded or colored. Where one of the cells was disabled for more than one time block (identified as a problem of continued durational problem in step 216), that cell will have its original (first layer) coloring superimposed with a second color or shading of the second layer.

After the map has been generated including both layers, the start time will be incremented in a step 220. For the first time through the map generation process, this would mean that the NAT application will cause 4 hours to be added to the 5223-hour start time, thus causing the next data collection queries (as will be discussed later) to run for hour number 5227.

In a next step 222, a timeout is instituted by the process. This time out may be preset in the application at some time (e.g., 3 seconds) enabling the user to adequately observe map trends and status between increments. Alternatively, it could be set by the user through the web browser interface 300 as shown at drop down menu 310. This drop down menu 310 will likely be set up with an automatic default to a particular increment (e.g., 3 seconds) which may be optionally changed by the user. Regardless, the time for the delay should be set at a level which will adequately delay the looping process in order for the map viewer to properly process the data and still allow for enough user viewing time.

After this, the process returns to step 210 and asks whether the start time (now incremented to hour number 5227) is equal to the established end time (hour number 5447). Because this is not yet true, the process will continue again through steps 214, 216, and 218, generating a newly generated map conveying the down activity and down duration information for the next four hour block (represented as hour 5227).

After this occurs, the start time will again be incremented in step 220 adding another four hours to 5227 to equal 5231. Step 222 will then pause the process for the 3 second delay selected (or defaulted to) in dropdown menu 310 and return the process to step 210.

This looping of the process through steps 214, 216, 218, 220, and 222 (and step 224 if necessary) will continue until the start time value equals the end time value of 5447. At each 4 hour increment, the layers will be displayed for the viewer. When the end time is reached, step 210 will in a step 226 notify the user through his or her web browser 102 that the process has been completed in a step 228.

The effect of the repeated loop involving steps 214, 216, 218, 220, and 222 is that of a series of map-web screens—appearing one after the other with a short delay between each refresh—creates a highly useful animation. This animation can be used for historical purposes to determine what went wrong with certain parts of a wireless network due to a destructive event. The information may also be used for network forecasting with respect to such events.

Other features may be added to further enhance the process. As can be seen in FIG. 3, the web browser might be adapted to include a forward and back toggle arrangement 308. One skilled in the art will know that the application of the present invention could be adapted to enable the user to use toggle arrows to advance reverse animations forward or back in time in time block increments (plus or minus 4 hours in the embodiment described above).

Another optional feature shown in the FIG. 3 embodiment is that of a preset event dropdown menu 306. This menu would be set up with the presets already in place for a specific event. This would be most useful for an event which is likely to generate recurring user interest, for example, a particular hurricane. In such a case, it would be inconvenient for multiple users to continually recall and then enter the most appropriate start and end time parameters. To alleviate this, the NAT application is adapted to, after receiving the start time, duration, and delay information for an event of interest, to save these parameters and present the event in dropdown menu 306. Once the parameters are saved and the event included in the list of items in menu 306, the selection of that event from the menu 306 will result in the parameters automatically being entered into the start date menu 316, duration menu 304, and delay menu 310 boxes. Conventional software will enable one skilled in the art to program NAT application 104 to do this. This enables the same event animation to be run over and over again at different times by different users. For example, users interested in seeing the animation of Hurricane Charley would be able to rerun the same animation by selecting that event from the drop down.

Web browser 300 has also been adapted to include a plurality of map navigational tools 314. These tools are used to define the geographic area surrounding a network event. They may also be used to zoom in or out to focus on desired areas. Conventional software will enable one skilled in the art to program NAT application 104 to do this.

Also included is a map legend 324. Legend 324 includes optional selections which will determine the scope of information subject to queries 214 and 216. With a down cell selection box 315, the NAT application will be set to display (in color coding) the downed cells. Beneath this box, a legend of color code indications 317 is provided to help the map user to determine particular failure causes from the colors of the downed cells appearing on the map.

A next box 321, if checked will cause the down-duration cells to be presented and superimposed on the map. In the FIG. 2 process discussed above, it was presumed that these boxes 315 and 321 were selected. It can, however, be seen from FIG. 3 that by not checking box 321, that the down-duration information (regarding the cells down for more than 4 hours) would not be shown on the map, and that step 216 in the process would not occur at all. Similarly, by not checking box 315, but leaving box 321 checked, the animation generated would only include the down-duration information. In this circumstance, step 214 would be eliminated from the FIG. 2 process, but step 216 would remain.

A couple of other boxes 319 in legend 324 enable the user to specify, e.g., only the cells effected by a specific event (e.g., hurricane Charley) or limit the map generated to only particular coverage areas (e.g., only those enlisting a particular kind of wireless networking protocol or type).

As can be seen, the present invention and its equivalents are well-adapted to provide a new and useful method of creating a wireless network geographical animation. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

The invention claimed is:

1. One or more computer-readable media, having computer-usable instructions embodied thereon for performing a method of managing a network, the method comprising:
    receiving a first status datum for a first network element at a first location at a first time;
    receiving a second status datum for said first network element at said first location at a second time;
    geographically displaying said first status datum; and
    geographically displaying said second status datum after geographically displaying said first status datum.

2. The media of claim 1 wherein said method comprises:
    receiving a third status datum for said first network element at a first location at a third time;
    geographically displaying said third status datum.

3. The media of claim 2 wherein said method comprises:
    geographically displaying said third status datum at a same interval after the displaying of said second datum as existed between the displaying of said first status datum and said second status datum.

4. The media of claim 1 wherein said method comprises:
    including hardware malfunction information in one of said first status datum, second status datum, and third status datum.

5. The media of claim 1 wherein said method comprises:
    including software malfunction information in one of said first status datum, second status datum, and third status datum.

6. The media of claim 1 wherein said method comprises:
    including power outage information in one of said first status datum, second status datum, and third status datum.

7. The media of claim 1 wherein said method comprises:
    including transport-failure information in one of said first status datum, second status datum, and third status datum.

8. The media of claim 1 wherein said method comprises:
    including information which indicates that the cause for one of said first status datum, second status datum, and third status datum is unknown.

9. One or more computer-readable media, having computer-usable instructions embodied thereon for performing a method of managing a network, the method comprising:
    receiving status information regarding a plurality of distinctly-located network elements at a first time;
    receiving status information regarding said plurality at a second time;
    geographically displaying said status information of said plurality of said network elements at said first time; and
    geographically displaying said status information regarding said plurality of network elements at said second time.

10. The media of claim 9, said method comprising:
    receiving status information regarding said plurality at a third time;
    geographically displaying status information at said third time after said displays of said first and second times.

11. The media of claim 10 wherein said method comprises:
    animating a network event by graphically displaying status information at said first, second, and third times.

12. The media of claim 11 wherein said animating step in said method comprises:
    using said first time as a start time; and
    using said third time as an end time.

13. The media of claim 10 wherein said method comprises:
    selecting said network elements from a wireless communications network in a particular geographic area.

14. A method of managing a network comprising:
    receiving a first status datum for a first network element at a first location at a first time;
    receiving a second status datum for said first network element at said first location at a second time;
    geographically displaying said first status datum; and
    geographically displaying said second status datum after geographically displaying said first status datum.

15. The method of claim 14 comprising:
    receiving a third status datum for said first network element at a first location at a third time;
    geographically displaying said third status datum.

16. The method of claim 15 comprising:
    geographically displaying said third status datum at a same interval after the displaying of said second datum as existed between the displaying of said first status datum and said second status datum.

17. The method of claim 14 comprising:
    including hardware malfunction information in one of said first status datum, second status datum, and third status datum.

18. The method of claim 14 comprising:
    including software malfunction information in one of said first status datum, second status datum, and third status datum.

19. The method of claim 14 comprising comprises:
    including power outage information in one of said first status datum, second status datum, and third status datum.

20. The method of claim 14 comprising:
    including transport-failure information in one of said first status datum, second status datum, and third status datum.

21. The method of claim 14 comprising:
    including information which indicates that the cause for one of said first status datum, second status datum, and third status datum is unknown.

22. A method of managing a network comprising:
    receiving status information regarding a plurality of distinctly-located network elements at a first time;
    receiving status information regarding said plurality at a second time;

geographically displaying said status information of said plurality of said network elements at said first time; and geographically displaying said status information regarding said plurality of network elements at said second time.

23. The method of claim 22 comprising:

receiving status information regarding said plurality at a third time;

geographically displaying status information at said third time after said displays of said first and second times.

24. The method of claim 23 comprising:

animating a network event by graphically displaying status information at said first, second, and third times.

25. The method of claim 24 wherein said animating step comprises:

using said first time as a start time; and using said third time as an end time.

26. The method of claim 22 comprising:

selecting said network elements from a wireless communications network in a particular geographic area.

27. A network-management system comprising:

a database having a first interface for periodically receiving status information regarding a plurality of distinctly-located network elements from a client in order to maintain a historical record of the status of said plurality of distinctly-located network elements;

a second interface into said database enabling a user to access status information at a plurality of instances in the historical record;

a geographical viewer for using said instances accessed to create an graphical animation by sequentially displaying each instance in said plurality of instances.

28. The system of claim 27 wherein said client is a human.

29. The system of claim 27 wherein said client is an automated client.

30. The system of claim 29 wherein said automated client is a ticketing system.

* * * * *